United States Patent
Bindlish et al.

(10) Patent No.: US 12,284,150 B2
(45) Date of Patent: Apr. 22, 2025

(54) UNIFIED AUDIENCE TARGETING SYSTEM

(71) Applicant: Microsoft Technology Licensing, LLC, Redmond, WA (US)

(72) Inventors: Gaurav Bindlish, Redmond, WA (US); Harish Jayanti, Redmond, WA (US); Payel Hazra, Kirkland, WA (US); Mitali Prakash Shenoy, Redmond, WA (US); Srinivasa Raghavan Santhanam, Bellevue, WA (US); Derrick Yeqiang Quan, Bellevue, WA (US); Kfir Ami-Ad, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 9 days.

(21) Appl. No.: 18/173,363

(22) Filed: Feb. 23, 2023

(65) Prior Publication Data
US 2024/0291788 A1    Aug. 29, 2024

(51) Int. Cl.
 G06F 15/16    (2006.01)
 H04L 51/214    (2022.01)
 G06F 3/0482    (2013.01)

(52) U.S. Cl.
 CPC .......... H04L 51/214 (2022.05); G06F 3/0482 (2013.01)

(58) Field of Classification Search
 CPC .............................. H04L 51/214; G06F 3/0482
 USPC ........................................................ 709/206
 See application file for complete search history.

(56) References Cited

U.S. PATENT DOCUMENTS

| | | | |
|---|---|---|---|
| 7,853,665 B1 | 12/2010 | Veeraraghavan et al. | |
| 10,448,120 B1 * | 10/2019 | Bursztyn | H04N 21/4532 |
| 10,846,709 B2 | 11/2020 | Wilson et al. | |
| 10,846,772 B2 | 11/2020 | Mowatt et al. | |

(Continued)

OTHER PUBLICATIONS

Chamberlain, Nate, "How to Enable and Use Audience Targeting for Sharepoint Pages and News", Retrieved From: https://natechamberlain.com/2021/06/04/how-to-enable-audience-targeting-of-sharepoint-pages-and-news/, Jun. 4, 2021, 6 Pages.

(Continued)

*Primary Examiner* — Imad Hussain
(74) *Attorney, Agent, or Firm* — Novo TechIP International PLLC

(57) ABSTRACT

A system for creating a target audience group includes receiving a request from a user interface screen, to create a target audience group from among users of an organization associated with a cloud computing environment, where the request including selected values for a plurality of categories of data associated with the users of the organization. Upon receiving the request; the method creates an audience targeting definition for the target audience group that includes the plurality of categories of data and their selected values and stores the audience targeting definition to a data store. Next, one or more data sources of the cloud computing environment are queried to identify users for which values for the categories of data corresponds with the selected values and a list of those users is stored in a different data store. The list of the users is then made available to a plurality of applications of the cloud computing environment for communicating with or presenting an experience to the members of the target audience group.

21 Claims, 9 Drawing Sheets

(56) References Cited

U.S. PATENT DOCUMENTS

| | | | |
|---|---|---|---|
| 10,915,973 B2 | 2/2021 | Yang et al. | |
| 11,012,758 B2 | 5/2021 | Lieberman et al. | |
| 11,188,950 B2 | 11/2021 | Liu | |
| 2010/0077053 A1* | 3/2010 | Haffner | H04L 51/48 709/206 |
| 2014/0278973 A1 | 9/2014 | Lowe et al. | |
| 2015/0186932 A1 | 7/2015 | Xu et al. | |
| 2016/0104067 A1 | 4/2016 | Xu et al. | |
| 2016/0119444 A1* | 4/2016 | Pinkovezky | H04L 51/214 709/204 |
| 2016/0343026 A1 | 11/2016 | Cheng et al. | |
| 2018/0018707 A1* | 1/2018 | Berry, Jr. | G06Q 30/0257 |

OTHER PUBLICATIONS

International Search Report and Written Opinion received for PCT Application No. PCT/US2024/016062, Jun. 18, 2024, 20 pages.

* cited by examiner

| Tenant ID 302 | Audience ID 304 | Country 306 | State 308 | City 310 | Department 312 | Time With Company 314 |
|---|---|---|---|---|---|---|
| 3be14b38-121f-4c7 | 6gv14k32-56 | United Sates | Washington | Redmond | Marketing | Less than 60 days |
| 3be14b38-121f-4c7 | 95we1h2l-87 | United Sates | California | San Jose | Legal | |

| Tenant ID 320 | Audience ID 322 |
|---|---|
| 3be14b38-121f-4c7 | 6gv14k32-56 |
| 3be14b38-121f-4c7 | 95we1h2l-87 |
| 3be14b38-121f-4c7 | 9rh17m43-70 |
| 3be14b38-121f-4c7 | 2kjwe154-85 |

FIG. 3B

| Tenant ID 330 | Audience ID 332 | User ID 334 |
|---|---|---|
| 3be14b38-121f-4c7 | 6gv14k32-56 | 8fs14dg3232-41<br>5df16lkdfgd4-53<br>2sd53df5389-32<br>5wew23jh42-67<br>8sv23jhe342-19 |
| 3be14b38-121f-4c7 | 95we1h2l-87 | 5df16lkdfgd4-53<br>8wew23jh45-88<br>7df16lkdfgd4-96 |
| 3be14b38-121f-4c7 | 9rh17m43-70 | 7df16lkdfgd4-96<br>5wew23jh42-67 |
| 3be14b38-121f-4c7 | 2kjwe154-85 | 8sv23jhe342-19<br>5wew23jh42-67<br>5df16lkdfgd4-53 |

FIG. 3C

UNIFIED AUDIENCE TARGETING SYSTEM

BACKGROUND

Organizations often have a need for providing specific information to target audience groups. For example, an organization may have a need to send a reminder to employees of a certain department to install a new version of an application. This may be made possible by utilizing email lists (e.g., email groups created for each department of an organization) and sending an email to the targeted list. However, if the target audience is more specific than a department-wide group, utilizing email lists may not be possible. For example, a target audience group that includes employees from a certain city, certain department and/or having a certain title may not be easily created using email lists.

Furthermore, while some communication applications provide mechanisms for creating audiences, an audience group created using one application cannot be used by other applications. This means that an administrator is required to be familiar with audience targeting features of various applications and spend time creating a new audience group for each different application that the administer wishes to utilize to send a targeted message. However, audience targeting features are not always easily discoverable and not easy to operate. As a result, creating audiences takes a considerable amount of additional work for administrators. Moreover, it is often difficult to create groups which are comprehensive of the administrators' needs without having too many groups to track and manage.

Hence, there is a need for an improved unified audience targeting system and method.

SUMMARY

In one general aspect, the instant disclosure presents a data processing system having a processor and a memory in communication with the processor wherein the memory stores executable instructions that, when executed by the processor, cause the data processing system to perform multiple functions. The function may include receiving a request, from a user interface screen to an audience targeting service, to create a target audience group from among users of an organization associated with a cloud computing environment, the request including selected values for a plurality of categories of data associated with the users of the organization; creating an audience targeting definition for the target audience group, the audience targeting definition including the plurality of categories of data and their selected values; triggering an audience member identification unit to identify members for the target audience group, from among the users of the organization, by querying one or more data sources of the cloud computing environment to identify one or more users for which values for the plurality of categories of data corresponds with the selected values; and accessing a list of the members of the target audience group to perform at least one of communicating with the members of the target audience group or presenting an experience to the members of the target audience group via an application of the cloud computing environment, wherein the target audience group can be used by a plurality of applications of the cloud computing environment or by an external application that has subscribed to the audience targeting service by using the client computing environment's internal permission determination feature.

In yet another general aspect, the instant disclosure presents a method for creating a target audience group. In some implementations, the method includes steps of receiving a request, from a user interface screen, to create a target audience group from among users of an organization associated with a cloud computing environment, the request including selected values for a plurality of categories of data associated with the users of the organization; creating an audience targeting definition for the target audience group, the audience targeting definition including the plurality of categories of data and their selected values; storing the audience targeting definition to a first data store of the cloud computing environment; querying one or more data sources of the cloud computing environment to identify one or more users for which values for the plurality of categories of data corresponds with the selected values; identifying the one or more users as members of the target audience group; storing a list of the members of the target audience group in a second data store; and making the list of the members of the target audience group available to a plurality of applications of the cloud computing environment for communicating with the members of the target audience group or presenting an experience to the members of the target audience group.

In a further general aspect, the instant application describes a non-transitory computer readable medium on which are stored instructions that when executed cause a programmable device to perform functions of receiving a request, from a user interface screen to a unified audience targeting service, to create a target audience group from among users of an organization associated with a cloud computing environment, the request including a set of rules for selecting the users of the organization; creating an audience targeting definition for the target audience group, the audience targeting definition including the selected rules; storing the audience targeting definition in a data store of the cloud computing environment; based on the set of rules, querying one or more data sources of the cloud computing environment that are associated with the organization to identify one or more users who according to the set of rules are a member of the target audience group; storing a user identification associated with the each of the identified one or more users in a target audience membership data structure; and accessing the target audience membership data structure via a look up service to perform at least one of communicating with the members of the target audience group or presenting an experience to members of the target audience group via an application of the cloud computing environment, wherein the target audience group is usable by a plurality of applications of the cloud computing environment, and the one or more data sources includes a plurality of organization data sources and data from the plurality of data sources can be used to identify the one or more users by utilizing any operator.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example

FIG. 2 depicts an example information schema for providing domain-specific knowledge about a document.

FIGS. 3A-3C depict example data structures for storing various types of data for the unified audience targeting system.

DETAILED DESCRIPTION

Figure 1:
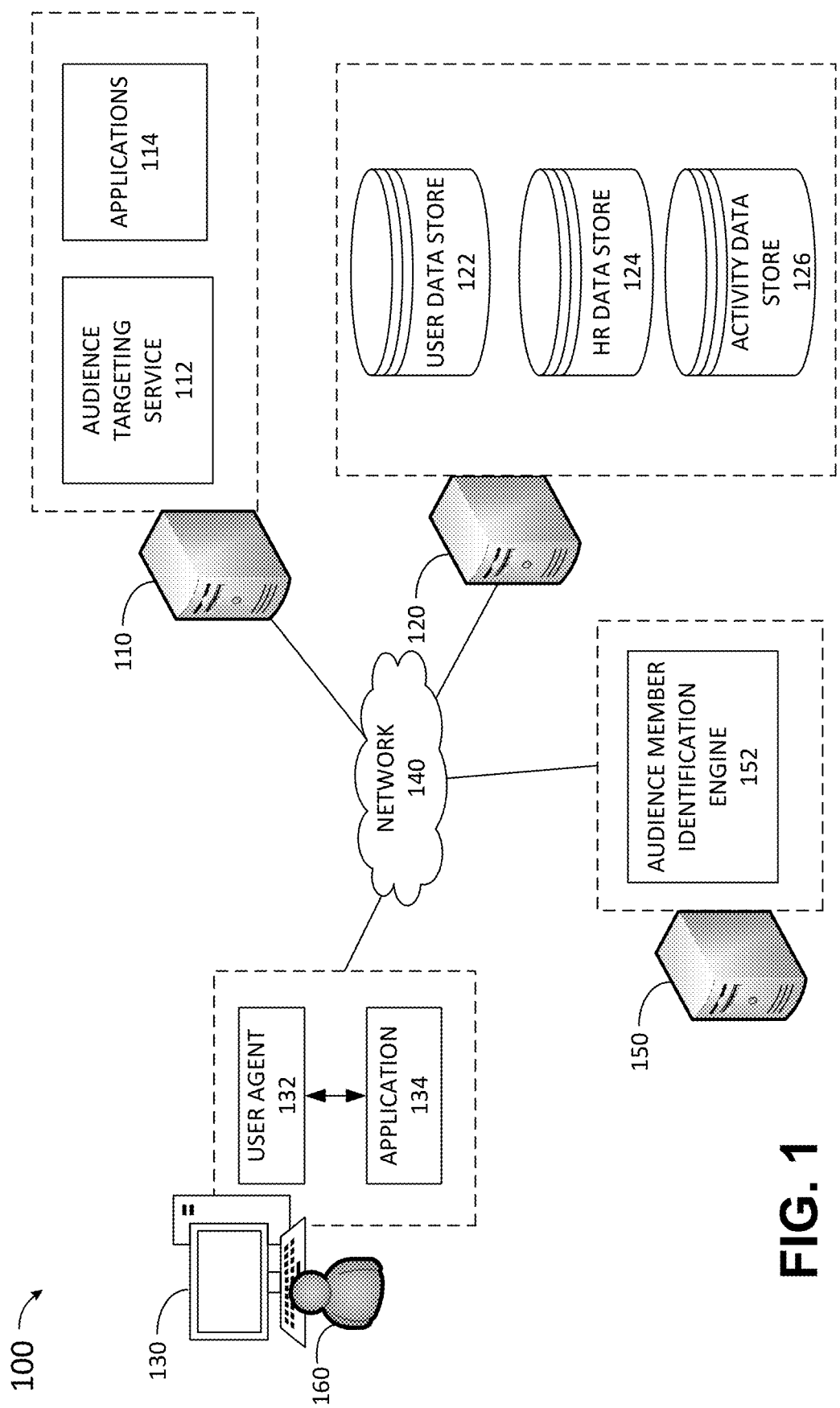
FIG. 1 depicts an example system upon which aspects of this disclosure are implemented.

Organizations sometimes have a need for communicating with target groups. For example, an organization having employees in multiple cities may need to send a reminder to employees in a one of the cities of about an upcoming event. When the target groups fall into broad categories, such as employees in a certain city, the organization may be able to use existing communication mechanisms to reach them (e.g., email groups). However, when the target group is more specific (e.g., employees having a certain title in a specific department who joined the company after a certain date), it is more challenging to identify individuals who fall into the target audience. The type of information required to create specific target audiences is often stored in different data sources, access to which may be restricted and may not be provided to various applications. Thus, there exists a technical problem of lack of mechanisms for creating target audiences within organizations that fall into specific categories.

Furthermore, while certain applications provide some audience targeting features, a targeted audience created for one application cannot be reused in another application. As a result, even if two different applications offer audience targeting mechanisms that provide the specific audience group an administrator is interested in, the administrator would have to spend additional time creating the targeted group for each application. For example, an administrator that needs to send an instant message and display a news post in the organization's news feed to the same target audience would have to utilize the instant messaging application as well as the application used to display the news feed to create the same target audience. However, the audience targeting mechanisms offered by the two applications are often not easily discoverable and operatable. As a result, creating audiences in two different applications requires proficiency in both applications. Furthermore, it takes an unnecessary amount of time to create a new target audience in each application, and to manage and track multiple target audiences across different applications and/or different departments in an organization. Thus, there exists a technical problem of lack of a unified audience targeting system via which target audiences can be created and used by multiple applications across an organization.

To address these technical problems and more, in an example, this description provides technical solutions for a unified audience targeting method and system that can be used by multiple products in a cloud computing environment to offer targeted experiences to target audience groups. The unified audience targeting provides a common platform for configuring and governing audience targeting membership groups. This is achieved by providing an audience targeting portal via an audience targeting user interface that enables a user to create target audience groups. This may be done by enabling the user to select audience filtering parameters. The filter parameters correspond with categories of information about users in an organization available via one or more data sources. The unified audience targeting system accesses data from multiple data sources to enable selection of specific target audience groups. Once the parameters are selected, an audience definition is created for the target audience group. This audience definition is stored in a storage medium and is accessible to a plurality of applications. As a result, once created, the same target audience can be used in different applications to provide a variety of experiences to the target audience. This is achieved by utilizing an organization-wide and/or cloud-based audience targeting service, storing the audience definitions and audience membership information in multiple places, and making the audience definitions and audience membership information available through a key value lookup service. In this manner, the technical solution provides a unified audience targeting that offers an easy-to-use audience targeting portal via which a target audience can be created and reused in multiple applications.

The technical solution described herein addresses the technical problem of inadequate and inefficient audience targeting mechanisms for creating target audience groups and providing a variety of experiences to the created target audience groups. The technical effects include (1) improving the efficiency of using an electronic device to create a target audience group by providing one audience targeting portal for creating audiences that can be used across different products and/or applications; (2) improving the accuracy of target audiences by enabling the use of up-to-date data sources for processing target audience groups; (3) ensuring security in an efficient manner by utilizing existing cloud computing capabilities such as compliance and monitoring; and (4) increasing user satisfaction by simplifying audience targeting.

As will be understood by persons of skill in the art upon reading this disclosure, benefits and advantages provided by such implementations can include, but are not limited to, a technical solution to the technical problems of lack of mechanisms for efficient and user-friendly audience targeting mechanism that can be used across an organization to communicate and/or provide experiences to the users of the organization (e.g., employees). Technical solutions and implementations provided herein offer a mechanism for providing a unified audience targeting system that operates efficiently because it leverages existing built-in capabilities of cloud computing environments such as the Microsoft M365 substrate. The benefits made available by these technology-based solutions provide a user-friendly mechanism for creating, maintaining and using target audience groups that can be accessed and used in a variety of applications.

As used herein, the terms "target audience," "target group" or "target audience group" refers to a group of users that fall into specific categories selected by an administrator of different user. The term "enterprise," "organization," or "tenant" as used herein refers to an organization having multiple users (e.g., employees, students, etc.) and using a cloud computing environment for computing purposes.

FIG. 1 illustrates an example system 100, upon which aspects of this disclosure are implemented. The system 100 includes a server 110, which itself includes an audience targeting service 112. While shown as one server, the server 110 may represent a plurality of servers that work together to deliver the functions and services provided by the audience targeting service 112. In some implementations, the server 110 operates as a cloud-based server for offering unified audience targeting services in one or more application such as the applications 114 and application 134.

The client device 130 can be a personal or handheld computing device having or being connected to input/output elements that enable a user 160 to interact with various applications (e.g., applications 114 or application 134) and/ or user agent 132. Examples of suitable client devices 130 include but are not limited to personal computers, desktop computers, laptop computers, mobile telephones, smart phones, tablets, phablets, smart watches, wearable computers, gaming devices/computers, televisions, and the like. The internal hardware structure of a client device is discussed in greater detail with respect to FIGS. 6 and 7. The user may be an administrator of an organization or otherwise a user that has permission to access and/or utilize a unified targeting system for the organization. Different The client device 130 is connected to the server 110 via a network 140. The network 140 may be a wired or wireless network(s) or a combination of wired and wireless networks that connect one or more elements of the system 100. The network 140 may have numerous different configurations including a star configuration, token ring configuration, or other configurations. For instance, the network 140 may include one or more local area networks (LAN), wide area networks (WAN) (e.g., the Internet), public networks, private networks, virtual networks, mesh networks, peer-to-peer networks, and/or other interconnected data paths across which multiple devices may communicate. The network 140 may also be coupled to or include portions of a telecommunications network for sending data in a variety of different communication protocols. In one implementation, the network 140 includes Bluetooth® communication networks or a cellular communications network for sending and receiving data including via short messaging service (SMS), multimedia messaging service (MMS), hypertext transfer protocol (HTTP), direct data connection, WAP, email, and the like.

The client device 130 includes user agent 132 and a local application 134. The application 134 is a computer program executed on the client device that configures the device 130 to be responsive to user input to allow a user to create a target audience group and/or to use an already created audience group to provide an experience to the members of the audience group. For example, the application 134 may provide a user interface screen that enables the user 160 to create a target audience group by selecting audience filtering parameters. Alternatively and/or additionally, the application 134 is an application that enables the user 160 to present an experience to the members of an already created audience group. For example, the application 134 may enable the user to send an email to an audience group, send an instant message to the audience group, display a specific news item in the news feed of the audience group, send a task bar notification to the audience group, add a calendar event to the calendars of the audience group, send an in-application notification to the audience group and the like. Examples of suitable applications include, but are not limited to, a communications application (e.g., email application, video-conferencing application, instant messaging application, etc.), word processing application, presentation application, note taking application, file management application and the like.

In some examples, the application used to create target audience groups, manage audience groups and/or utilize audience groups is executed on the server 110 (e.g., application 114) and provided via an online service. In such implementations, web applications communicate via the network 140 with a user agent 132, such as a browser, executing on the client device 130. The user agent 132 provides a user interface that allows the user to interact with the audience targeting service 112 and/or applications 114. In some implementations, target audience creation, maintenance and use is handled via the audience targeting service 112 and provided via a user interface screen displayed via the user agent 132. The audience targeting service 112 may interact with user-facing applications such as the application 134 or user agent 132 via web Application Programming Interfaces (APIs).

The audience targeting service 112 receives a request for creating a target audience group from the user agent 132 or application 134. The request includes data about selected parameters for identifying users that fall into the target audience. The categories correspond to categories of data available for users of an organization and may be restricted depending on access rights of the user 160. The data is made available via one or more data sources, as discussed in more detail below. Once the request is received, the audience targeting service 112 utilizes built-in capabilities of the cloud computing environment to create an audience definition for the target audience. The audience targeting service 112 then transmits a request to an audience member identification engine 152 for performing batch processing or event processing of user data.

The audience member identification engine 152 is included in a server 150. In an alternative implementation, the audience member identification engine 152 is included in the server 110 or a different server in the system 100. The audience member identification engine 152 is a background processor that can handle efficient batch processing of user data. The audience member identification engine 152 can be an event-based processor or a time-based processor (e.g., time-based assistant processor). In implementations where the audience member identification engine 152 is an event-based processor, creation of new audience definitions triggers the processor to begin processing data. In implementations where the processor is time-based, the audience member identification engine 152 runs at scheduled intervals. In some implementations, the audience member identification engine 152 is a user-based processor that performs batch processing of individual user data stores. The processor receives user information spread across a defined interval and processes the information. A user-based processor provides highly latent components for batch processing. As discussed above, in some implementations, the audience member identification engine 152 runs at scheduled intervals (e.g., once in every 24 hours) and processes data for users of opt-in organizations to determine if a user belongs to any audience rules for a given organization. An example of a user-based processor is a background cache-building service that maintains updating across users throughout the day. Other types of processors that may be used by the audience member identification engine 152 to perform user data processing for creating/updating audience targeting definitions include a near real time processor that processes information as soon as there is any new audience definition.

The system 100 also includes a server 120 which is connected to or includes the user data store 122, HR data store 124, and activity data store 126. Each of the data stores 122, 124 and 126 function as a repository in which databases relating to user data is stored. Although shown as a single data store, each of the data stores 122, 124 and 126 may be representative of multiple storage devices and data stores which are accessible by audience member identification engine 152. The user data store 122 represents a data store that stores user profile data. While displayed as one data store, the user data store 122 may be representative of multiple data stores that store user profile data for various users. The user profile data store 122 stores profile data for users of an organization's computing systems. The profile data is often collected when an account is first created for the user. The number and categories of data collected may vary and may depend on the organization. In an example, the profile data includes the user's name, address, work title, devices assigned to the user, user ID, applications the user has access to, the user's email address and the like. Similarly, the HR data store 124 includes human resources related data associated with employees of an organization. The human resources data may include users' work titles, departments, supervisors, date of hire, office location and the like. The activity data store 126 includes user activity data. The activity data may be retrieved from documents the user has worked on, user's calendar, emails and/or status of projects. In an example, the activity data store 126 includes information about the status of a training a user is required to complete. By retrieving this information, the audience targeting system can be used to send reminders to users who have not completed their training.

Figure 2:
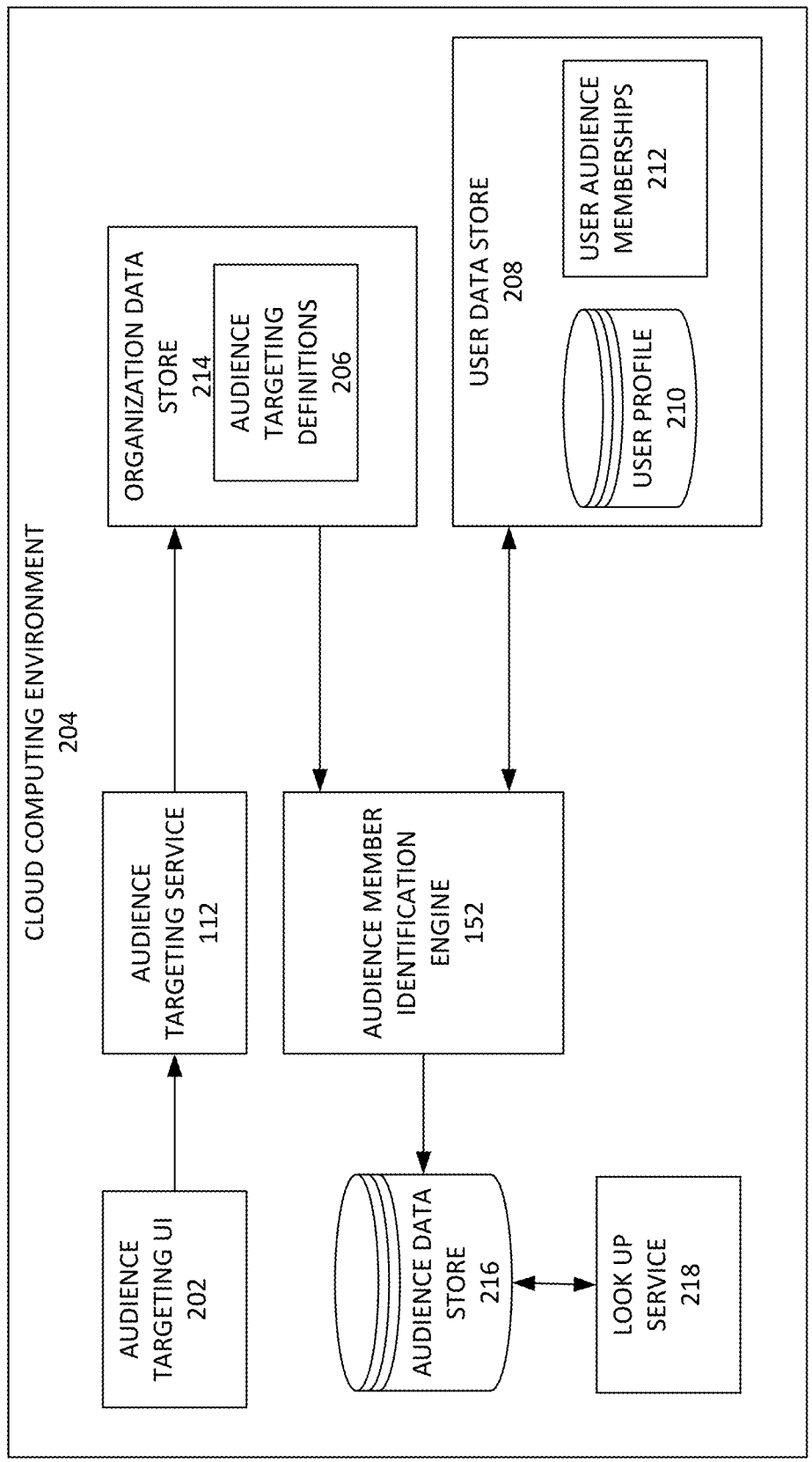
FIG. 2 depicts an example data flow between some elements of an example system upon which aspects of this disclosure are implemented.

FIG. 2 depicts an example data flow between some elements of an example system upon which aspects of this disclosure are implemented. Data from an audience targeting user interface (UI) 202 is supplied to a cloud computing environment 204 which includes the audience targeting service 112. The data include selected parameters for a target audience and may also include identifying information for the target audience (e.g., a name associated with the target audience via which the target audience can later be retrieved, managed and/or used). As discussed above, the selections are made via the UI screen and may be presented as filters that the administrator can select to create a target audience. The filters may vary depending on the organization and the permissions/access rights of the user that creates the target audience. In an example, the administrator of an organization that has opted-into (e.g., has purchased the audience targeting service) is able to set up the audience targeting system for the organization by selecting or creating filters that correspond with the types of data the organization collects about users and granting specific access rights to particular users within the organization to create, maintain or use the audience targeting UI 202. Additionally, the audience targeting UI 202 can be used to write custom rules to create an audience definition. For example, the user can write a rule for an audience of users in the marketing department who have been in the company for less than 60 days. The rule is then processed by the audience targeting service 112 to create audience definitions.

The selected audience parameters are provided to the audience targeting service 112 for processing. The audience targeting service 112 may act as an intermediary service for the cloud computing environment 204 that exposes web APIs to user-facing applications and enables the applications to access some of the data stored in and capabilities offered by the cloud computing environment 204. In some implementations, the cloud computing environment 204 is a cloud computing environment that provides cloud computing services to a plurality of organizations. In an example, the cloud computing environment 204 is the Microsoft M365 substrate or a similar environment that provides cloud storage, web applications and/or cloud services to a plurality of organizations.

In some implementations, each organization in the cloud computing environment 204 has an organization data store 214 for storing organization-specific data. The organization data store 214 operates as a database in which organization-related information is stored. An organization is a customer of the cloud computing environment 204 that has a plurality of users. The organization data stores are partitions of organization data in a data store that the cloud computing environment 204 provisions programmatically to facilitate storing audience rules for different organizational customers of the cloud computing environment 204. Each organization data store stores audience rules for the corresponding organization for which it is created. Once an organization data store is created, a first party application or service can discover and query the organization data store and read and write data in the organization data store.

The audience targeting service 112 receives the request to create a new target audience from the audience targeting UI 202, determines which organization (e.g., tenant) the request relates to, authenticates the user for communicating with the audience targeting service 112 (e.g., based on roles and/or permissions), and submits a request to the organization data store 214 associated with the organization to store a new audience definition in an audience targeting definitions collection 206 of the organization data store 214. In some implementations, upon receiving and authenticating the request, the audience targeting service 112 creates the organization data store 214 within a data store of the cloud computing environment 204. Once the organization data store 214 is created, the audience targeting service 112 writes a new audience definition or updates an existing audience definition in the audience targeting definitions collection 206, when an update is being made to an existing target audience. The audience targeting definitions collection 206 may include one or more data structures (e.g., data tables) that stores a list of target audiences created for the organization, as well as information associated with each target audience. The audience targeting definitions collection 206 stores a list of rules and/or parameters that define the set of users for each target audience. The details of the audience targeting definitions collection 206 are discussed in more detail with respect to FIG. 3A.

Once the definition for the target audience is created and/or updated, the parameters associated with the target audience are transmitted to the audience member identification engine 1522 for processing. The audience member identification engine 152 operates to identify users of the organization that fall into each one of the target audiences defined in the audience targeting definitions collection 206. This is achieved by submitting a query to data sources that store the sources of data needed for complying with the audience definitions. In an example, these data stores include domain data sources such as a profile data store, an admin data store, an HR data store, an activity data store and the like. In some implementations, the audience member identification engine 152 queries user mailboxes to obtain the information. The data sources can include any data source associated with the organization within the cloud computing environment, including custom data sources that are provided by and/or uploaded by the organization. The various data sources can be distinct domain data sources and can be joined by using any operators. The operators can include the AND operator and the NOT operator. In this manner, any attribute of the data in any of the data sources can be used to create custom targeting of users. This provides finer graining targeting and filtering of users.

In some implementations, submitting a request to each data store involves making an API call to the data store to obtain properties corresponding to the parameters of the audience definition rules for the users to determine if the user falls into a certain audience group. For example, the audience member identification engine 152 makes an API call to one or more various content repositories inside the organization or in public data sources to get properties such as country, department, office location and Tenant ID of users of the organization to determine if the user qualifies as a member of the target audience. In some implementations, this includes making a call to the user profile data store 210, which may be stored in a user data store 208 of the cloud computing environment 204. The calls to the data stores may be made at scheduled intervals for every user in an organization to ensure that the target audience membership list is accurate and up to date. In an example, the requests to the data stores for obtaining user information are made once a day or once a week. Furthermore, calls to the data stores are made when an audience definition changes, which can be tracked through tenant settings, when a new audience definition is created, or when user data undergoes a change.

Once a user is identified as being a member of a given target audience, a user audience membership data structure 212 is created in the user data store 208 for the user. The user audience membership data structure 212 stores data relating to the audience group(s) the user is a member of. The user audience membership data structure 212 may be created upon receiving a request from the audience member identification engine 152 for creating the data structure. Alternatively, if the user data store 208 already stores a user audience membership data structure 212, information about a new or updated audience group to which the user belongs is added to the user audience membership data structure 212. The user data store 208 refers to a partition of data at the user level that is stored within the cloud computing environment's data store. The user audience membership data structure 212 may be made available through a representational state transfer (REST) API. In some implementations, the cloud computing environment's data store is a NoSQL-type database service that provides storage of application-specific, user-centric data in the Substrate. By utilizing the cloud computing environment's data store, new entity-types of data can be stored in the user, group, and/or organization data stores in the cloud computing environment. The cloud computing environment's data store provides superior availability, high performance, flexible storage and querying of data, and consistency guarantees with comprehensive geographical compliance and in-built security. In an example, the cloud computing environment's data store is fully schema-agnostic, can index data it ingests, provides change notifications and syncing abilities, and serve fast queries. As such, by utilizing the cloud computing environment's data store, the unified audience targeting system can access and process data quickly and efficiently, and can provide a unified audience targeting experience across multiple applications.

In addition to storing the audience membership data in user data stores, the audience member identification engine 152 also writes audience membership data to an audience data store 216. The audience data store 216 may be a compliant data store that is located within or outside of the cloud computing environment 204. In some implementations, the data store 216 is a distributed NoSQL platform to store audience membership data. The stored data can be accessed from the object store-through an operating system client software development kit. The audience data store 216 stores a data structure (e.g., database) of target audience memberships for one or more organizations. For example, the audience data store 216 may store a different database of audience memberships for each organization. The audience membership information includes an audience ID or target audience ID for each target audience created, and a list of user IDs for users that qualify for membership in the target audience.

When the processor makes calls to the underlying data sources to confirm user data, if user membership information changes (e.g., a user is added or removed from the membership list), changes are made to the audience membership list in the audience data store 216. When a request to access or use a target audience is received, the lookup service 218, which is built on top of the audience data store 216 queries the audience data store 216 for the user IDs of the members of the target audience. The user ID information is then used to communicate with or provide experiences to the members of the target audience. As a result, any application within the cloud computing environment can be used to communicate with or provide experiences to members of each target audience group. In an example, the unified audience targeting feature is integrated into various applications such that the receiver of a target audience communication may not be able to tell that the communication is an audience communication (e.g., the user may believe the message is personalized for them). This enables personalization of products via a unified audience targeting system. Different APIs may be used to communicate with various applications to enable use of target audience groups. In addition to being accessible to applications within the cloud computing environment, the membership information within the audience data store 216 may also be available to applications that are external to the cloud computing environment 204. This may be achieved by utilizing the internal permission determination capabilities of the cloud computing environment 204 to determine which users, organizations, and/or application are authorized to use the audience target group.

In some implementations, some or all of the functions of the audience member identification engine 152 are performed by the audience targeting service 112. In an example, the audience member identification engine 152 is included in the audience targeting service 112.

FIGS. 3A-3C depict example data structures for storing various types of data for the unified audience targeting system. FIG. 3A depicts an example data structure 300A, such as a database table, for storing audience targeting definitions. The data structure 300A includes a tenant ID field 302, an audience ID field 304 and one or more additional fields that identify the rules set by and/or categories of data selected by the administrator. The tenant ID field 302 is used to store the tenant ID associated with the administrator/user who requested creation of a new target audience group and/or updating of an existing target audience group. The tenant ID field 302 is used to ensure data from the correct organization is retrieved/used. In implementations where a separate data structure is created for each separate tenant, the tenant ID field 302 may not be needed. The audience ID field 304 is used to store an audience ID for the target audience group being created/modified. The audience ID may be an automatically generated system ID to enable efficient identification of individual audience target groups. For example, when a request for a new target audience group is received, the audience targeting service may generate a unique audience ID for the new target audience group and store the audience ID along with the audience targeting definitions in the data structure 300A.

The additional fields 306, 308, 310, 312 and 314 may correspond with fields of data available in the underlying data sources (e.g., profile data, admin data, HR data, etc.) and are categories selected by the administrator for the target audience group. The tenant ID field 302, audience ID field 304 and the additional fields determine the schema for the target audience definition. For example, the target audience 316 has a schema of Tenant ID, Audience ID, Country, State, City, Department, and Time with company. As the audience definitions changes from one target audience to another, the additional fields change from one target audience to another. For example, the target audience 318 has a schema of Tenant ID, Audience ID, Country, State, City, and Department which is different from the schema of target audience 316. Furthermore, the selected values for each of the fields 306, 308, 310, and 312 are different for the target audience 316 and target audience 316 and correspond with the administrator's selected categories. For example, target audience 316 is geared towards users in the company that are in the marketing department in Redmond, Washington, while the target audience 318 is users who are in the legal department in San Jose, California. Thus, the data structure 300A stores the target audience definitions for a collection of target audiences.

FIG. 3B depicts an example data structure 300B, such as a database table, for storing user audience memberships. As discussed above, the user audience membership data may be stored in a user data store of the cloud computing environment's data store and is used to identify target audience groups a user belongs to. The data structure 300B includes a tenant ID field 320 and an audience ID field 322. As discussed above, the tenant ID field 320 is used to store the tenant ID associated with the administrator/user who requested creation of a new target audience group and/or updating of an existing target audience group. In some implementations, the tenant ID field 320 is not included in the data structure 300B. The audience ID field 322 is used to store the unique audience ID associated with each target audience group the user is a member of. Thus, the schema for the data structure 300B is the tenant ID and the audience ID. This enables the data structure 300B to store a list of target audiences each user belongs to. The list is updated, when user data changes or a target audience is modified.

FIG. 3C depicts an example data structure 300C, such as a database table, for storing target audience memberships for a plurality of users. As discussed above, target audience membership data may be stored in an audience data store and is used to identify users that are members of each target audience group. The data structure 300C includes a tenant ID field 330, audience ID field 332, and user ID field 334. As discussed above, the tenant ID field 330 is used to store the tenant ID associated with the tenant for which the target audience group is created and/or updated. The tenant ID field helps identify the tenant in implementations, where different tenants' audience targeting data is stored in the same data structure 300C. In some implementations, the tenant ID field 330 is not included in the data structure 300C. The audience ID field 332 is used to store the unique audience ID associated with each target audience group. The user ID field 334 is used to store the user IDs of users who are members of each target audience group. As depicted, the number of users who are members of each target audience group varies from group to group. It should be noted that while a limited number of user IDs is displayed in the user ID field 334 for the data structure 300C, in real implementations, hundreds or thousands of users may be members of a target audience group. The schema for the data structure 300C is the tenant ID, audience t ID and user ID. This enables the data structure 300C to store target audience membership information in a place and format that is easily accessible.

Figure 4:
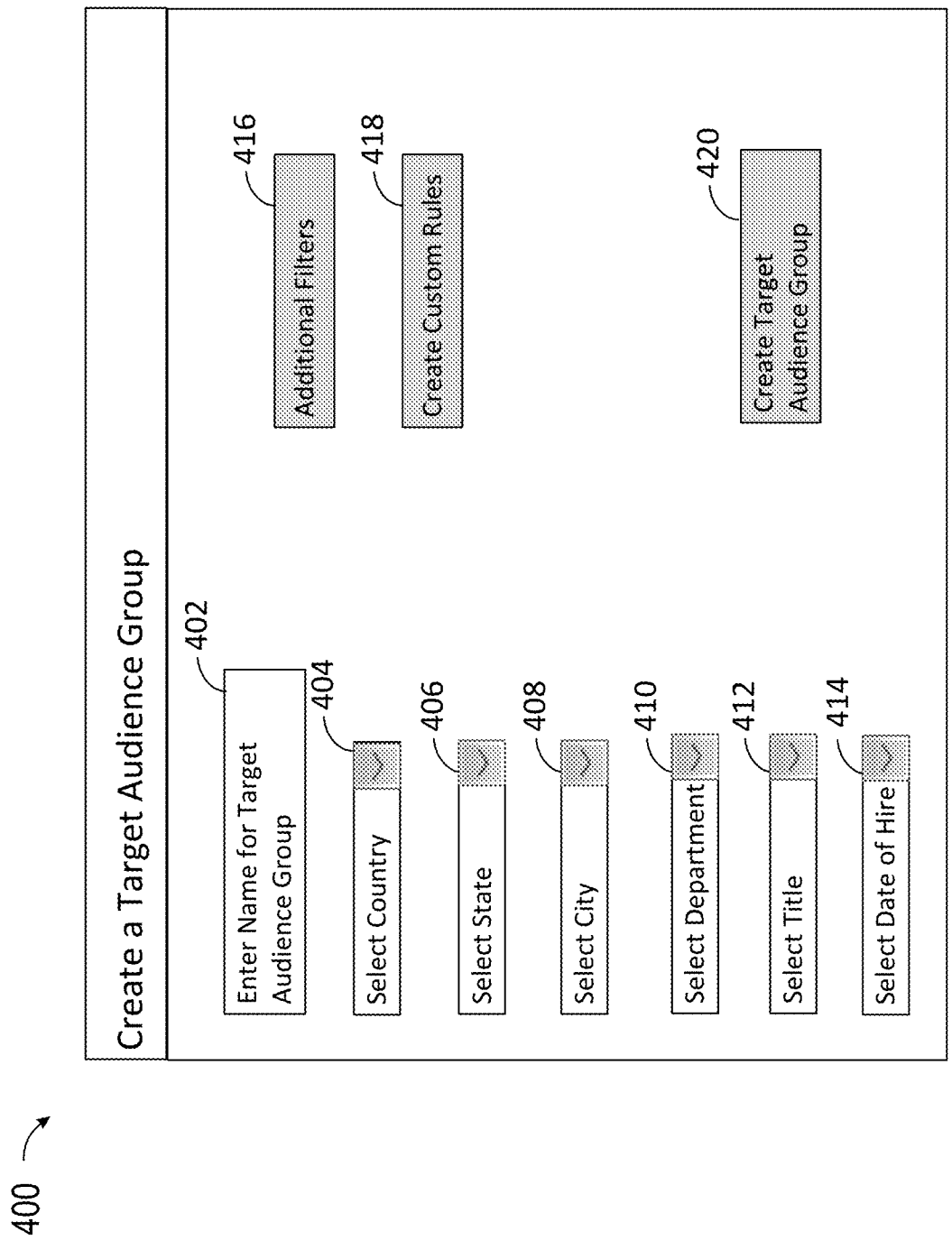
FIG. 4 depicts an example GUI screen of a unified audience targeting system.

FIG. 4 depicts an example GUI screen 400 of a unified audience targeting system. The GUI screen 400 is displayed when an authorized user navigates to an administrator page (e.g., portal) for creating/modifying target audience groups and/or opens an application for creating/modifying target audience groups. For example, the GUI screen 400 may be displayed when the user selects a UI element for creating target audience groups on an administrator's portal. Before displaying the GUI screen 400, the cloud computing environment associated with the user may determine if the user is authorized to create target audience groups for the organization and/or what data sources the user is authorized to access for creating/modifying target audience groups. This is achieved by utilizing the cloud computing environment's built in permission and authorization mechanisms.

The GUI screen 400 includes a UI element 402 for entering a name for the new target audience group. This enables the user to enter a customized name for each target audience group which can then be used to communicate with and/or provide experiences to the members of the target audience group from a variety of applications. The name may be associated with the unique audience ID created for each target audience to enable quick reference to the target audience group. containing various menu options for performing different tasks in the application.

The GUI screen 400 also includes a number of selectable UI elements for selecting various categories of users. The UI elements 404, 406, 408, 410, 412, and 414 are dropdown menus that present the user with selectable options for selecting a country, state, city, department, title, and date of hire, respectively, for the new target audience group. The user can choose one or more of the UI elements 404, 406, 408, 410, 412, and 414 to select desired categories for the members of the target audience group. The selectable UI elements may correspond to categories of data in the underlying data sources available to the administrator and/or available in the organization's data sources. In an example, the categories that are displayed on the GUI screen 400 are selected by an administrator who sets up the organization's unified audience targeting system.

In addition to the displayed categories to choose from, the GUI screen 400 also includes a UI element 416 for enabling the user to view additional filters. Selecting the UI element 416 results in the display of additional filters the user may select for the target audience group. Furthermore, the UI element 418 can be selected to create custom rules for the target audience group. The UI element 418 may be utilized when the existing categories of data (e.g., displayed filters) do not correspond with the categories the user desires to select for the target audience group. When the UI element 418 is selected, an input may be displayed that enables the user to write a custom rule. For example, the user may write users who have used their videoconferencing application in the last week. The written rule is then transmitted to the audience targeting service which may operate with a natural language processing model or other algorithm to identify categories of data that correspond with the requirements of the rule.

Once the desired filters are selected and/or a custom rule is written, the user may utilize the UI element 420 to submit a request for creating the desired target audience group. In some implementations, once the target audience group is created, a notification is displayed to the user to confirm that the group has been created. A new GUI screen (not shown) may then be used to submit a request to communicate with the target audience group via one or more applications. Additionally, upon creation, the target audience group may be available as a usable group in various applications for communicating with and/or providing experiences to the target audience. For example, once created, the name of the group may be used in an email application to send an email to the target audience group. In another example, the name of the group can be used to display a news feed item to the target audience group. In yet another example, the name of the target audience group can be used in a calendar application to send a meeting request to the target audience group.

Figure 5:
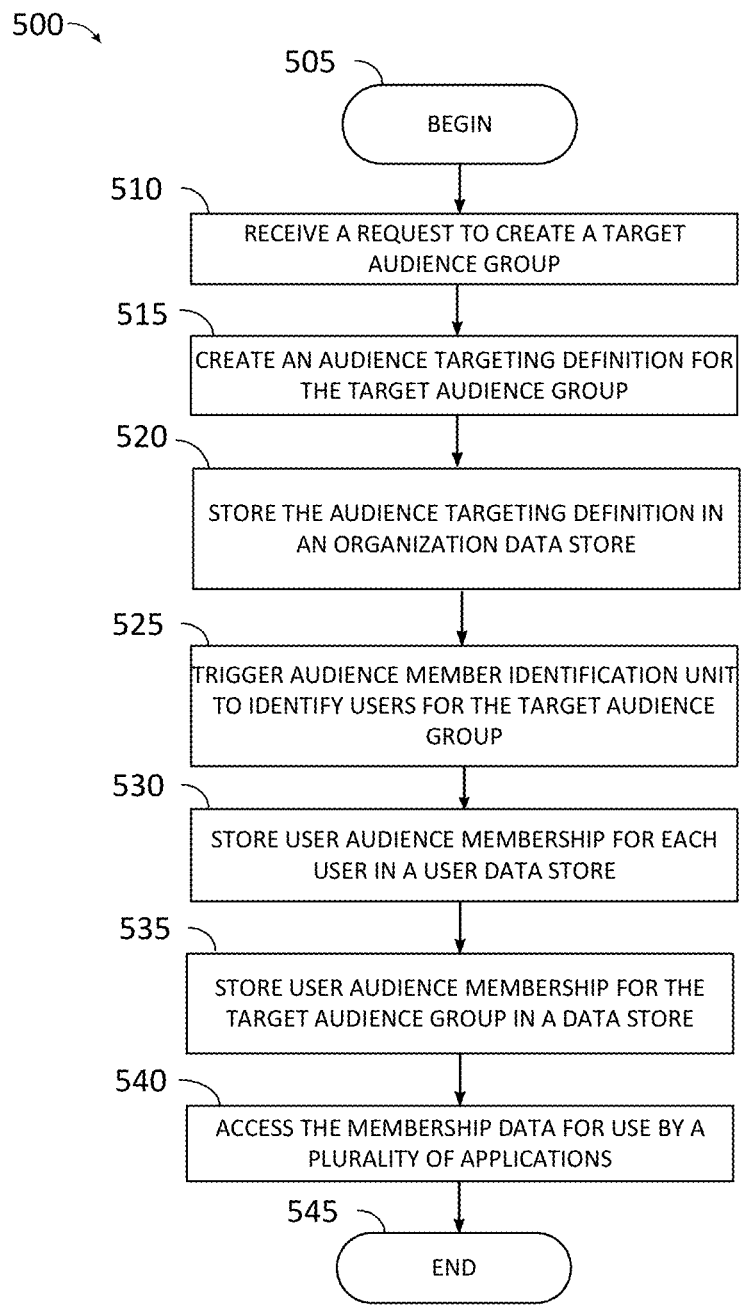
FIG. 5 is a flow diagram depicting an example method for creating and using a target audience group.

FIG. 5 is a flow diagram depicting an exemplary method 500 for creating and using a target audience group. One or more steps of the method 500 may be performed by an audience targeting service such as the audience targeting service 112 of FIGS. 1 and 2 or by a processor such as processor 152 of FIGS. 1 and 2. The method 500 begins, at 505, and proceeds to receive a request to create a target audience group, at 510. The request is received via a user interface screen associated with a unified audience targeting system. This may occur, for example, when a user who is permitted to access an audience targeting portal of an organization's computing environment submits a request via the portal to create a new target audience group. In some implementations, the request includes a name for the target audience group. The request also includes values for a selected number of data categories associated with the users of the organizations. The data categories correspond with categories of data available from one or more data sources that store user related data for users of the organization's cloud computing environment.

Once the request is received by an audience targeting service, an audience targeting definition is created for the target audience group, at 515. In some implementations, this is done by adding an entry to an audience targeting definition data structure that is stored in a data store of the cloud computing environment. The data store located in an organization data store of the cloud computing environment for the specific organization. The audience targeting definition includes a plurality of fields and may include a tenant ID field, an audience ID field and a plurality of fields corresponding the selected categories received in the request. The audience targeting definition is stored in the data store, the at 520.

After storing the audience targeting definition, method 500 proceeds to trigger an audience member identification unit to identify users that are members of the target audience group, at 525. The audience member identification unit may be a time-based processor or event-based processor, and the triggering event may include new data stored in the audience targeting definition. When the processor is an event-based processor, the processor may subscribe to the event of new audience definition being stored in the data store, and thus receive a triggering event when a new definition is stored.

The processor identifies the users by querying data sources of the cloud computing environment that store user data to determine which users have values that correspond to the selected values for the plurality of selected categories of data. For example, when the categories include country and city and the selected values are Canada and Vancouver, the processor queries the user profile data store to identify users whose data indicates they are from Canada and Vancouver. In some implementations, the processor queries the user's mailboxes to identify users that are members of the target audience group.

Once the users are identified, a user audience membership data is stored for users who are identified as being members of the target audience group, at 530. This involves adding an entry to an existing user audience membership data structure for each member or creating a new user audience membership data structure if one does not exist for the member. The entry identifies the target audience group by for example a unique ID for the target audience group. In this manner, each user's audience membership data structure identifies target audience groups to which the user belongs.

Additionally, method 500 stores user audience membership for the target audience group in a data store, at 535. This involves creating a data entry or modifying an already created data entry in an audience data store. The data entry identifies the target audience group (e.g., by storing the unique ID of the target audience group) and includes user IDs for the users who are identified as being members of the target audience group. In some implementations, the processor runs based on scheduled intervals to query the data sources for each target audience group to ensure the membership list is accurate and up to date. The user audience membership can then be accessed, at 540, for use by a plurality of applications of the cloud computing environment to perform at least one of communicating with the members of the target audience group or presenting an experience to the members of the target audience group via an application of the cloud computing environment, before method 500 ends, at 545.

Figure 6:
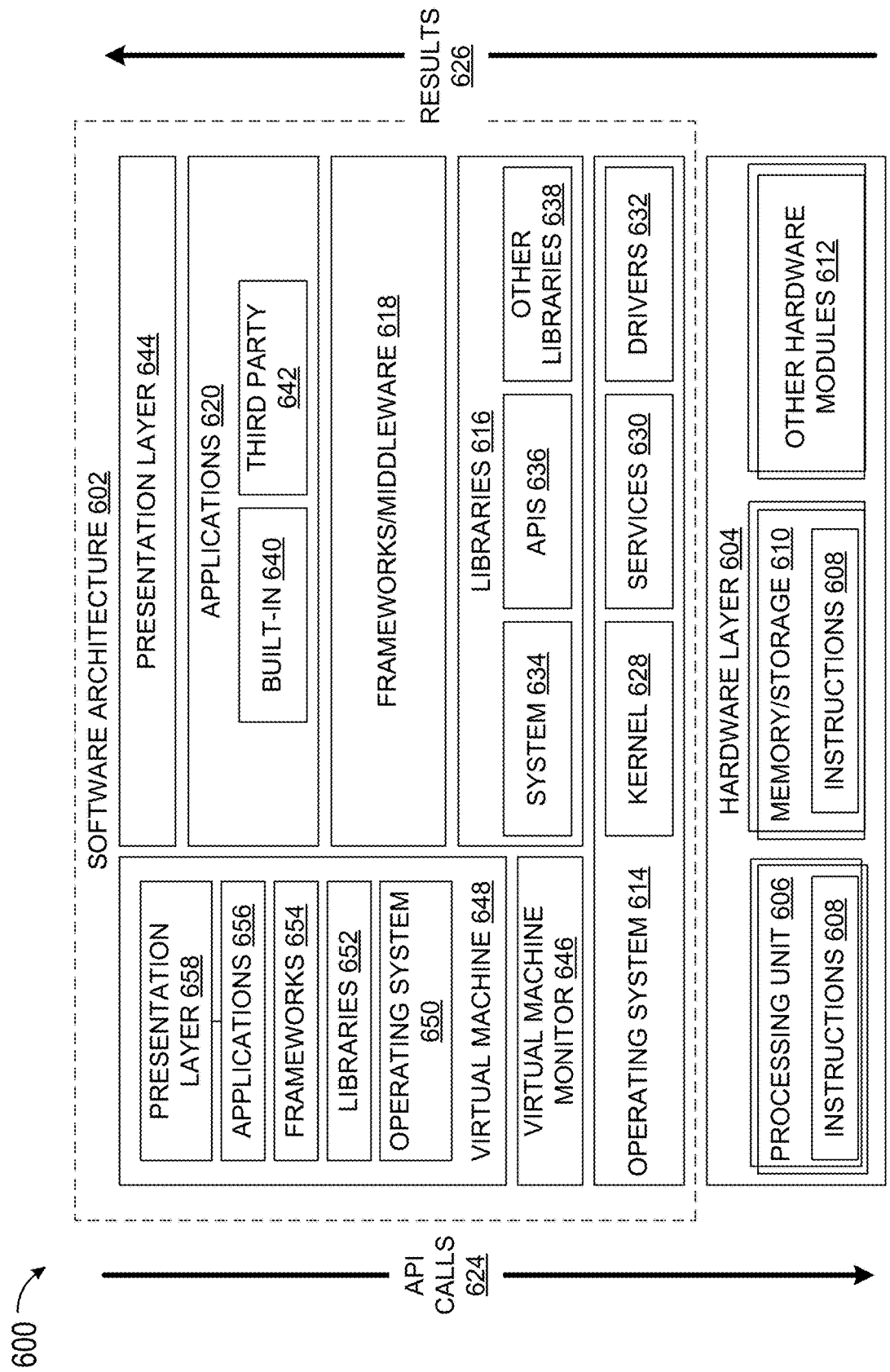
FIG. 6 is a block diagram illustrating an example software architecture, various portions of which may be used in conjunction with various hardware architectures herein described.

FIG. 6 is a block diagram 600 illustrating an example software architecture 602, various portions of which may be used in conjunction with various hardware architectures herein described, which may implement any of the above-described features. FIG. 6 is a non-limiting example of a software architecture, and it will be appreciated that many other architectures may be implemented to facilitate the functionality described herein. The software architecture 602 may execute on hardware such as client devices, native application provider, web servers, server clusters, external services, and other servers. A representative hardware layer 604 includes a processing unit 606 and associated executable instructions 608. The executable instructions 608 represent executable instructions of the software architecture 602, including implementation of the methods, modules and so forth described herein.

The hardware layer 604 also includes a memory/storage 610, which also includes the executable instructions 608 and accompanying data. The hardware layer 604 may also include other hardware modules 612. Instructions 608 held by processing unit 606 may be portions of instructions 608 held by the memory/storage 610.

The example software architecture 602 may be conceptualized as layers, each providing various functionality. For example, the software architecture 602 may include layers and components such as an operating system (OS) 614, libraries 616, frameworks 618, applications 620, and a presentation layer 644. Operationally, the applications 620 and/or other components within the layers may invoke API calls 624 to other layers and receive corresponding results 626. The layers illustrated are representative in nature and other software architectures may include additional or different layers. For example, some mobile or special purpose operating systems may not provide the frameworks/middleware 618.

The OS 614 may manage hardware resources and provide common services. The OS 614 may include, for example, a kernel 628, services 630, and drivers 632. The kernel 628 may act as an abstraction layer between the hardware layer 604 and other software layers. For example, the kernel 628 may be responsible for memory management, processor management (for example, scheduling), component management, networking, security settings, and so on. The services 630 may provide other common services for the other software layers. The drivers 632 may be responsible for controlling or interfacing with the underlying hardware layer 604. For instance, the drivers 632 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 616 may provide a common infrastructure that may be used by the applications 620 and/or other components and/or layers. The libraries 616 typically provide functionality for use by other software modules to perform tasks, rather than interacting directly with the OS 614. The libraries 616 may include system libraries 634 (for example, C standard library) that may provide functions such as memory allocation, string manipulation, file operations. In addition, the libraries 616 may include API libraries 636 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 616 may also include a wide variety of other libraries 638 to provide many functions for applications 620 and other software modules.

The frameworks 618 (also sometimes referred to as middleware) provide a higher-level common infrastructure that may be used by the applications 620 and/or other software modules. For example, the frameworks 618 may provide various graphic user interface (GUI) functions, high-level resource management, or high-level location services. The frameworks 618 may provide a broad spectrum of other APIs for applications 620 and/or other software modules.

The applications 620 include built-in applications 640 and/or third-party applications 642. Examples of built-in applications 640 may include, but are not limited to, a contacts application, a browser application, a location application, a media application, a messaging application, and/or a game application. Third-party applications 642 may include any applications developed by an entity other than the vendor of the particular system. The applications 620 may use functions available via OS 614, libraries 616, frameworks 618, and presentation layer 644 to create user interfaces to interact with users.

Some software architectures use virtual machines, as illustrated by a virtual machine 648. The virtual machine 648 provides an execution environment where applications/modules can execute as if they were executing on a hardware machine (such as the machine depicted in block diagram 700 of FIG. 7, for example). The virtual machine 648 may be hosted by a host OS (for example, OS 714) or hypervisor, and may have a virtual machine monitor 646 which manages operation of the virtual machine 648 and interoperation with the host operating system. A software architecture, which may be different from software architecture 602 outside of the virtual machine, executes within the virtual machine 648 such as an OS 650, libraries 652, frameworks 654, applications 656, and/or a presentation layer 658.

Figure 7:
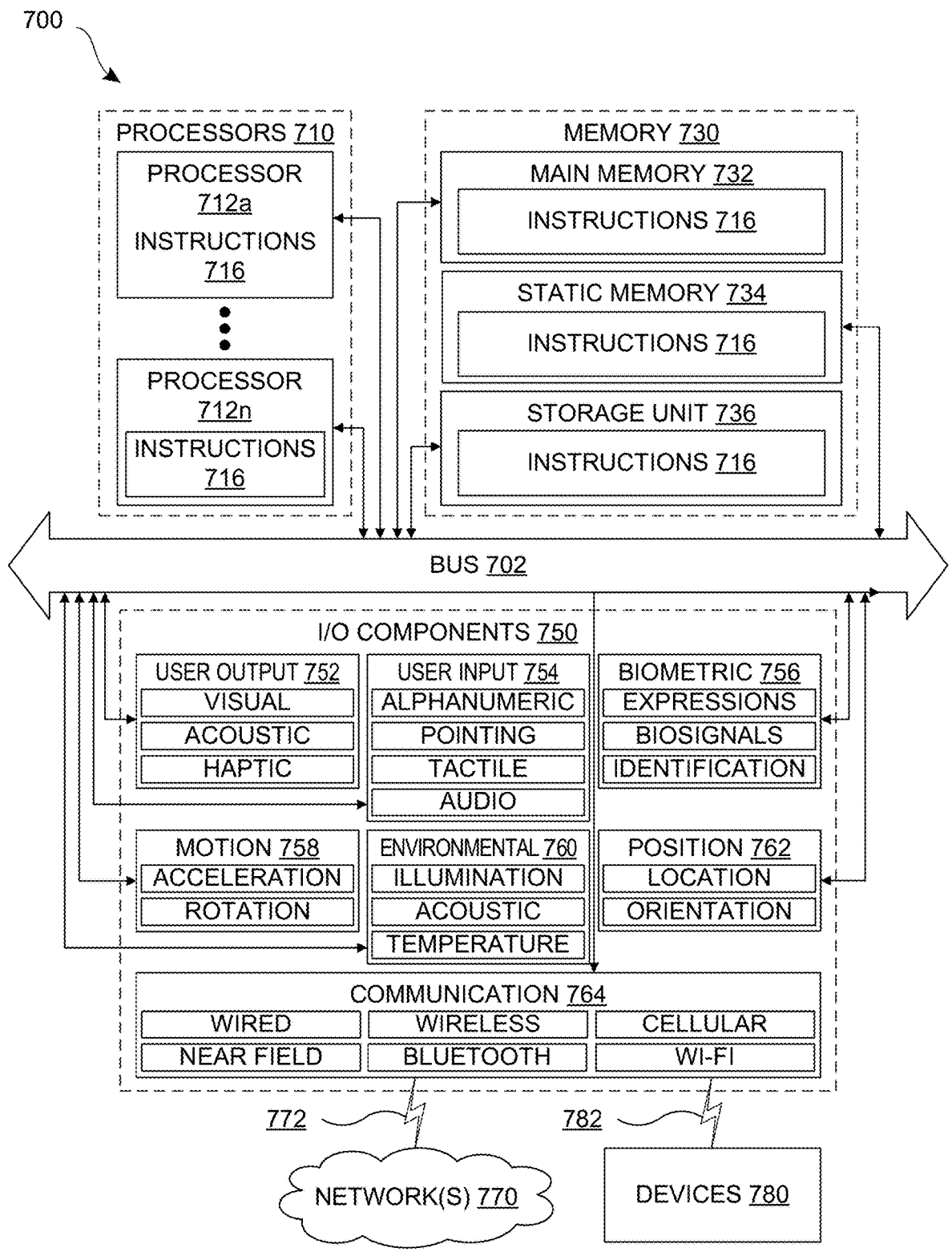
FIG. 7 is a block diagram illustrating components of an example machine configured to read instructions from a machine-readable medium and perform any of the features described herein.

FIG. 7 is a block diagram illustrating components of an example machine 700 configured to read instructions from a machine-readable medium (for example, a machine-readable storage medium) and perform any of the features described herein. The example machine 700 is in a form of a computer system, within which instructions 716 (for example, in the form of software components) for causing the machine 700 to perform any of the features described herein may be executed. As such, the instructions 716 may be used to implement methods or components described herein. The instructions 716 cause unprogrammed and/or unconfigured machine 700 to operate as a particular machine configured to carry out the described features. The machine 700 may be configured to operate as a standalone device or may be coupled (for example, networked) to other machines. In a networked deployment, the machine 700 may operate in the capacity of a server machine or a client machine in a server-client network environment, or as a node in a peer-to-peer or distributed network environment. Machine 700 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 700 is illustrated, the term "machine" includes a collection of machines that individually or jointly execute the instructions 716.

The machine 700 may include processors 710, memory 730, and I/O components 750, which may be communicatively coupled via, for example, a bus 702. The bus 702 may include multiple buses coupling various elements of machine 700 via various bus technologies and protocols. In an example, the processors 710 (including, for example, a central processing unit (CPU), a graphics processing unit (GPU), a digital signal processor (DSP), an ASIC, or a suitable combination thereof) may include one or more processors 712a to 712n that may execute the instructions 716 and process data. In some examples, one or more processors 710 may execute instructions provided or identified by one or more other processors 710. The term "processor" includes a multi-core processor including cores that may execute instructions contemporaneously. Although FIG. 7 shows multiple processors, the machine 700 may include a single processor with a single core, a single processor with multiple cores (for example, a multi-core processor), multiple processors each with a single core, multiple processors each with multiple cores, or any combination thereof. In some examples, the machine 700 may include multiple processors distributed among multiple machines.

The memory/storage 730 may include a main memory 732, a static memory 734, or other memory, and a storage unit 736, both accessible to the processors 710 such as via the bus 702. The storage unit 736 and memory 732, 734 store instructions 716 embodying any one or more of the functions described herein. The memory/storage 730 may also store temporary, intermediate, and/or long-term data for processors 710. The instructions 716 may also reside, completely or partially, within the memory 732, 734, within the storage unit 736, within at least one of the processors 710 (for example, within a command buffer or cache memory), within memory at least one of I/O components 750, or any suitable combination thereof, during execution thereof. Accordingly, the memory 732, 734, the storage unit 736, memory in processors 710, and memory in I/O components 750 are examples of machine-readable media.

As used herein, "machine-readable medium" refers to a device able to temporarily or permanently store instructions and data that cause machine 700 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 716) for execution by a machine 700 such that the instructions, when executed by one or more processors 710 of the machine 700, cause the machine 700 to perform and one or more of the features described herein. Accordingly, a "machine-readable medium" may refer to a single storage device, as well as "cloud-based" storage systems or storage networks that include multiple storage apparatus or devices.

The I/O components 750 may include a wide variety of hardware components adapted to receive input, provide output, produce output, transmit information, exchange information, capture measurements, and so on. The specific I/O components 750 included in a particular machine will depend on the type and/or function of the machine. For example, mobile devices such as mobile phones may include a touch input device, whereas a headless server or IoT device may not include such a touch input device. The particular examples of I/O components illustrated in FIG. 7 are in no way limiting, and other types of components may be included in machine 700. The grouping of I/O components 750 are merely for simplifying this discussion, and the grouping is in no way limiting. In various examples, the I/O components 750 may include user output components 752 and user input components 754. User output components 752 may include, for example, display components for displaying information (for example, a liquid crystal display (LCD) or a projector), acoustic components (for example, speakers), haptic components (for example, a vibratory motor or force-feedback device), and/or other signal generators. User input components 754 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 750 may include biometric components 756, motion components 758, environmental components 760 and/or position components 762, among a wide array of other environmental sensor components. The biometric components 756 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 762 may include, for example, location sensors (for example, a Global Position System (GPS) receiver), altitude sensors (for example, an air pressure sensor from which altitude may be derived), and/or orientation sensors (for example, magnetometers). The motion components 758 may include, for example, motion sensors such as acceleration and rotation sensors. The environmental components 760 may include, for example, illumination sensors, acoustic sensors and/or temperature sensors.

The I/O components 750 may include communication components 764, implementing a wide variety of technologies operable to couple the machine 700 to network(s) 770 and/or device(s) 780 via respective communicative couplings 772 and 782. The communication components 764 may include one or more network interface components or other suitable devices to interface with the network(s) 770. The communication components 764 may include, for example, components adapted to provide wired communication, wireless communication, cellular communication, Near Field Communication (NFC), Bluetooth communication, Wi-Fi, and/or communication via other modalities. The device(s) 780 may include other machines or various peripheral devices (for example, coupled via USB).

In some examples, the communication components 764 may detect identifiers or include components adapted to detect identifiers. For example, the communication components 764 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 764, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

Generally, functions described herein (for example, the features illustrated in FIGS. 1-7) can be implemented using software, firmware, hardware (for example, fixed logic, finite state machines, and/or other circuits), or a combination of these implementations. In the case of a software implementation, program code performs specified tasks when executed on a processor (for example, a CPU or CPUs). The program code can be stored in one or more machine-readable memory devices. The features of the techniques described herein are system-independent, meaning that the techniques may be implemented on a variety of computing systems having a variety of processors. For example, implementations may include an entity (for example, software) that causes hardware to perform operations, e.g., processors functional blocks, and so on. For example, a hardware device may include a machine-readable medium that may be configured to maintain instructions that cause the hardware device, including an operating system executed thereon and associated hardware, to perform operations. Thus, the instructions may function to configure an operating system and associated hardware to perform the operations and thereby configure or otherwise adapt a hardware device to perform functions described above. The instructions may be provided by the machine-readable medium through a variety of different configurations to hardware elements that execute the instructions.

In the following, further features, characteristics and advantages of the invention will be described by means of items:

Item 1. A data processing system comprising:
  a processor; and
  a memory in communication with the processor, the memory comprising executable instructions that, when executed by the processor, cause the data processing system to perform functions of:
    receiving a request, from a user interface screen to an audience targeting service, to create a target audience group from among users of an organization associated with a cloud computing environment, the request including selected values for a plurality of categories of data associated with the users of the organization;
    creating an audience targeting definition for the target audience group, the audience targeting definition including the plurality of categories of data and their selected values;
    triggering an audience member identification unit to identify members for the target audience group, from among the users of the organization, by querying one or more data sources of the cloud computing environment to identify one or more users for which values for the plurality of categories of data corresponds with the selected values; and
    accessing a list of the members of the target audience group to perform at least one of communicating with the members of the target audience group or presenting an experience to the members of the target audience group via an application of the cloud computing environment,
    wherein the target audience group can be used by a plurality of applications of the cloud computing environment or by an external application that has subscribed to the audience targeting service by using the client computing environment's internal permission determination feature.

Item 2. The data processing system of item 1, wherein a built-in capability of the cloud computing environment is utilized to determine that a user who submitted the request is authorized to create the target audience group.

Item 3. The data processing system of any of items 1 or 2, wherein the audience member identification unit is a time-based processor or an event-based processor.

Item 4. The data processing system of any preceding item, wherein the audience member identification unit creates the list of the members of the target audience group.

Item 5. The data processing system of any preceding item, wherein the audience member identification unit submits a request to add an entry to a user audience membership data structure associated with each user who is a member of the target audience group, the entry storing a unique audience identification for the target audience group.

Item 6. The data processing system of item 5, wherein the list of the members of the target audience group is usable by the organization and a plurality of applications of the cloud computing environment.

Item 7. The data processing system of any preceding item, wherein the audience member identification unit submits a request to add an entry to an audience data membership data structure for the target audience group, the entry storing a unique audience identification for the target audience group, and a list of user identifications for the members of the target audience group.

Item 8. The data processing system of item 7, wherein the one or more data sources include any organization data store.

Item 9. The data processing system of any preceding item, wherein the one or more data sources of the cloud computing environment include domain data sources.

Item 10. The data processing system of any preceding item, wherein the user interface screen provides a unified target audience group creation portal for creating target audience groups from among users of the organization for use across the plurality of applications of the cloud computing environment.

Item 11. The data processing system of any preceding item, wherein the audience member identification unit queries the one or more data sources of the cloud computing environment to identify the one or more users for which values for the plurality of categories of data corresponds with the selected values based on a predetermined schedule to update the list of the members.

Item 12. A method for creating a target audience group comprising:
  receiving a request, from a user interface screen, to create a target audience group from among users of an organization associated with a cloud computing environment, the request including selected values for a plurality of categories of data associated with the users of the organization;
  creating an audience targeting definition for the target audience group, the audience targeting definition including the plurality of categories of data and their selected values;
  storing the audience targeting definition to a first data store of the cloud computing environment;
  querying one or more data sources of the cloud computing environment to identify one or more users for which values for the plurality of categories of data corresponds with the selected values;

identifying the one or more users as members of the target audience group;

storing a list of the members of the target audience group in a second data store; and making the list of the members of the target audience group available to a plurality of applications of the cloud computing environment for communicating with the members of the target audience group or presenting an experience to the members of the target audience group.

Item 13. The method of item 12, a built-in capability of the cloud computing environment is utilized to determine that a user who submitted the request is authorized to create the target audience group.

Item 14. The method of item 13, wherein the user is an administrator of the organization and the built-in capacity determines authorization based on a role of the user.

Item 15. The method of any of items 12-14, wherein the user interface screen includes a plurality of user interface elements for selecting the values for selected categories of data associated with the users of the organization.

Item 16. The method of any of items 12-15, further comprising submitting a request to add an entry to a user audience membership data structure associated with each user who is a member of the target audience group, the entry storing a unique audience identification for the target audience group.

Item 17. The method of any of items 12-16, wherein the one or more data sources includes a custom data store provided by the organization store.

Item 18. A non-transitory computer readable medium on which are stored instructions that, when executed, cause a programmable device to perform functions of:

receiving a request, from a user interface screen to a unified audience targeting service, to create a target audience group from among users of an organization associated with a cloud computing environment, the request including a set of rules for selecting the users of the organization;

creating an audience targeting definition for the target audience group, the audience targeting definition including the selected rules;

storing the audience targeting definition in a data store of the cloud computing environment;

based on the set of rules, querying one or more data sources of the cloud computing environment that are associated with the organization to identify one or more users who according to the set of rules are a member of the target audience group;

storing a user identification associated with the each of the identified one or more users in a target audience membership data structure; and accessing the target audience membership data structure via a look up service to perform at least one of communicating with the members of the target audience group or presenting an experience to members of the target audience group via an application of the cloud computing environment, wherein:
the target audience group is usable by a plurality of applications of the cloud computing environment, and
the one or more data sources includes a plurality of organization data sources and data from the plurality of data sources can be used to identify the one or more users by utilizing any operator.

Item 19. The non-transitory computer readable medium of item 18, wherein the set of rules is based on an attribute of data in any of the one or more data sources.

Item 20. The non-transitory computer readable medium of items 18 or 19, wherein the operator includes at least an and operator and a not operator.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

In the foregoing detailed description, numerous specific details are set forth by way of examples in order to provide a thorough understanding of the relevant teachings. It will be apparent to persons of ordinary skill, upon reading this description, that various aspects can be practiced without such details. In other instances, well known methods, procedures, components, and/or circuitry have been described at a relatively high-level, without detail, in order to avoid unnecessarily obscuring aspects of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows, and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly identify the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
   a processor; and
   a memory in communication with the processor, the memory comprising executable instructions that, when executed by the processor, cause the data processing system to perform operations of:
      receiving a request, from a user interface screen associated with a unified audience targeting service, to create a target audience group from among users of an organization associated with a cloud computing environment, the request including selected values for a plurality of categories of data associated with the users of the organization;
      creating an audience targeting definition for the target audience group, the audience targeting definition including the plurality of categories of data and their selected values;
      triggering an audience member identification unit to identify members for the target audience group, from among the users of the organization, by querying one or more data sources of the cloud computing environment to identify one or more users for which values for the plurality of categories of data corresponds with the selected values; and
      accessing a list of the members of the target audience group to perform at least one of communicating with the members of the target audience group or presenting an experience to the members of the target audience group via an application of the cloud computing environment,
      wherein:
         the cloud computing environment provides cloud computing services that include a plurality of user-facing applications and cloud storage to a plurality of organizations, the organization being one of the plurality of organizations to which the cloud computing services are provided, and each organization of the plurality of organizations having a plurality of users,
         each organization in the cloud computing environment has an organization data store for storing organization specific data and the organization data store each stores audience targeting rules for an organization for which it was created,
         the audience targeting definition is stored in an audience targeting definitions collection of the organization data store in the cloud computing environment,
         the unified audience targeting service communicates with the plurality of user-facing applications of the cloud computing environment via one or more application programming interfaces to enable each of the plurality of user-facing applications to use a same created target audience group by using an internal permission determination feature of the cloud computing environment, and
         the cloud computing environment provides syncing functionalities to the unified audience targeting service.

2. The data processing system of claim 1, wherein a built-in capability of the cloud computing environment is utilized to determine that a user who submitted the request is authorized to create the target audience group.

3. The data processing system of claim 1, wherein the audience member identification unit is a time-based processor or an event-based processor.

4. The data processing system of claim 1, wherein the audience member identification unit creates the list of the members of the target audience group.

5. The data processing system of claim 1, wherein the audience member identification unit submits a request to add an entry to a user audience membership data structure associated with each user who is a member of the target audience group, the entry storing a unique audience identification for the target audience group.

6. The data processing system of claim 5, wherein the list of the members of the target audience group is usable by the organization and a plurality of applications of the cloud computing environment.

7. The data processing system of claim 1, wherein the audience member identification unit submits a request to add an entry to an audience data membership data structure for the target audience group, the entry storing a unique audience identification for the target audience group, and a list of user identifications for the members of the target audience group.

8. The data processing system of claim 7, wherein the one or more data sources include the organization data store.

9. The data processing system of claim 1, wherein the one or more data sources of the cloud computing environment include domain data sources.

10. The data processing system of claim 1, wherein the user interface screen provides a unified target audience group creation portal for creating target audience groups from among users of the organization for use across a plurality of applications of the cloud computing environment.

11. The data processing system of claim 1, wherein the audience member identification unit queries the one or more data sources of the cloud computing environment to identify the one or more users for which values for the plurality of categories of data corresponds with the selected values based on a predetermined schedule to update the list of the members.

12. The data processing system of claim 1, wherein, upon receiving the request, the unified audience targeting service:
   determines which organization from among of the plurality of organizations, the request relates to;
   authenticates a user from which the request was received for communicating with the unified audience targeting service; and
   submits a request to an organization data store associated with the organization to store a new audience definition in the audience targeting definitions collection of the organization data store.

13. A method for creating a target audience group comprising:

receiving a request, from a user interface screen associated with a unified audience targeting service, to create a target audience group from among users of an organization associated with a cloud computing environment, the request including selected values for a plurality of categories of data associated with the users of the organization;

creating an audience targeting definition for the target audience group, the audience targeting definition including the plurality of categories of data and their selected values;

storing the audience targeting definition to a first data store of the cloud computing environment;

querying one or more data sources of the cloud computing environment to identify one or more users for which values for the plurality of categories of data corresponds with the selected values;

identifying the one or more users as members of the target audience group;

storing a list of the members of the target audience group in a second data store; and making the list of the members of the target audience group available to a plurality of user-facing applications of the cloud computing environment via one or more application programming interfaces to enable each of the plurality of user-facing applications to communicate with the members of the target audience group or present an experience to the members of the target audience group via the unified audience targeting service, wherein:
the cloud computing environment provides cloud computing services that include a plurality of applications and cloud storage to a plurality of organizations, the organization being one of the plurality of organizations to which of the cloud computing services are provided, and each organization of the plurality of organizations having a plurality of users, each organization in the cloud computing environment has an organization data store for storing organization specific data and the organization data store each stores audience targeting rules for the organization for which it was created, the audience targeting definition is stored in an audience targeting definitions collection of the organization data store in the cloud computing environment, and the cloud computing environment provides syncing functionalities to the unified audience targeting service.

14. The method of claim 13, a built-in capability of the cloud computing environment is utilized to determine that a user who submitted the request is authorized to create the target audience group.

15. The method of claim 14, wherein the user is an administrator of the organization and a built-in capacity of the cloud computing environment determines authorization based on a role of the user.

16. The method of claim 13, wherein the user interface screen includes a plurality of user interface elements for selecting the values for selected categories of data associated with the users of the organization.

17. The method of claim 13, further comprising submitting a request to add an entry to a user audience membership data structure associated with each user who is a member of the target audience group, the entry storing a unique audience identification for the target audience group.

18. The method of claim 13, wherein the one or more data sources includes a custom data store provided by the organization data store.

19. A non-transitory computer readable medium on which are stored instructions that, when executed, cause a programmable device to perform functions of:

receiving a request, from a user interface screen associated with a unified audience targeting service, to create a target audience group from among users of an organization associated with a cloud computing environment, the request including a set of rules for selecting the users of the organization;

creating an audience targeting definition for the target audience group, the audience targeting definition including the set of rules;

storing the audience targeting definition in a data store of the cloud computing environment;

based on the set of rules, querying one or more data sources of the cloud computing environment that are associated with the organization to identify one or more users who according to the set of rules are members of the target audience group;

storing a user identification associated with each of the one or more users identified in a target audience membership data structure; and accessing the target audience membership data structure via a look up service to perform at least one of communicating with the members of the target audience group or presenting an experience to the members of the target audience group via an application of the cloud computing environment, wherein:
the unified audience targeting service communicates with a plurality of user-facing applications via one or more application programming interfaces to enable each of the plurality of user-facing applications to use the target audience group, the one or more data sources includes a plurality of organization data sources and data from the one or more data sources can be used to identify the one or more users by utilizing an operator, the cloud computing environment provides cloud computing services that include a plurality of user-facing applications and cloud storage to a plurality of organizations, the organization being one of the plurality of organizations to which cloud computing services are provided, and each organization of the plurality of organizations having a plurality of users, each organization in the cloud computing environment has an organization data store for storing organization specific data and the organization data store each stores audience targeting rules for an organization for which it was created, the audience targeting definition is stored in an audience targeting definitions collection of the organization data store in the cloud computing environment, and the cloud computing environment provides syncing functionalities to the unified audience targeting service.

20. The non-transitory computer readable medium of claim 19, wherein the set of rules is based on an attribute of data in any of the one or more data sources.

21. The non-transitory computer readable medium of claim 19, wherein the operator includes at least an and operator and a not operator.

* * * * *